Figures 1, 2:
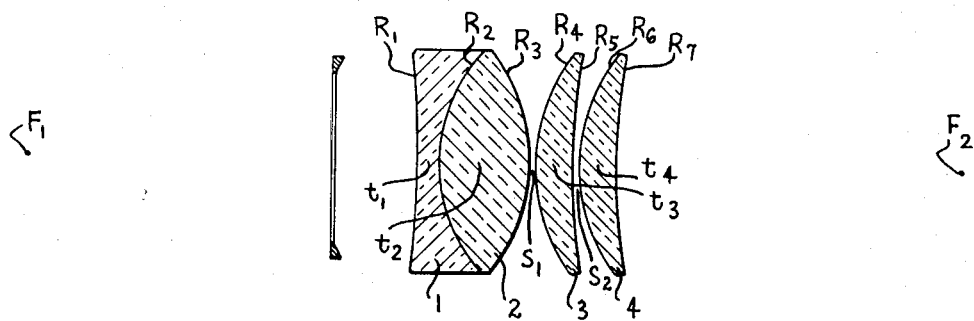

April 8, 1958

R. B. TACKABERRY ET AL 2,829,560

TELESCOPE EYEPIECE SYSTEM

Filed Oct. 15, 1956

| LENS | N | V | RADII | THICKNESS |
|---|---|---|---|---|
| 1 | 1.7506 | 27.7 | $R_1 = -7.94 F$<br>$R_2 = +.9349 F$ | $t_1 = .118 F$ |
| 2 | 1.517 | 64.5 | $R_3 = -1.0249 F$ | $t_2 = .521 F$<br>$S_1 = .0136 F$ |
| 3 | 1.517 | 64.5 | $R_4 = +1.0704 F$<br>$R_5 = +4.4071 F$ | $t_3 = .225 F$<br>$S_2 = .0728 F$ |
| 4 | 1.517 | 64.5 | $R_6 = +1.0527 F$<br>$R_7 = +3.5231 F$ | $t_4 = .219 F$ |

INVENTOR
ROBERT B. TACKABERRY
ROBERT M. MULLER
BY
Herbert C. Kimball
ATTORNEY

United States Patent Office 2,829,560
Patented Apr. 8, 1958

2,829,560
TELESCOPE EYEPIECE SYSTEM

Robert B. Tackaberry, Tonawanda, and Robert M. Muller, Cheektowaga, N. Y., assignors to American Optical Company, Southbridge, Mass., a voluntary association of Massachusetts Application October 15, 1956, Serial No. 615,796

5 Claims. (Cl. 88—57)

This invention relates to a telescope eye-piece adequately corrected for color. Three convergent components are used of which the first (i. e. the one nearest the object) is a doublet and the other two are single lenses of crown glass.

An object of our invention is to obtain an eye-piece having a flat field, the full correction for color being accomplished within the eyepiece itself.

Important advantages of our invention are accomplished by selecting glasses for the front doublet so that the ratio of the relative dispersions, i. e. the V value of the glass of the first lens divided by the V value of the glass of the second lens lies between .415 and .445. The radius of curvature of the internal contact surfaces should lie between .86 and 1.01 times the equivalent focal length of the eyepiece. We prefer, as a further refinement of the eyepiece that the rear face of the second lens of the doublet have a radius of curvature lying between .96 and 1.11 times the equivalent focal length of the eyepiece, and that the ratio of the radii of the front surface of the front lens and the rear surface of the second lens of the doublet lies between 7.4 and 8.4.

A preferred example of telescope eye-piece according to our invention is shown in the accompanying drawing in which Fig. 1 shows a preferred form of the invention, and
Fig. 2 gives constructional data for the optical system of Fig. 1.

Referring to Fig. 1 the first of the three convergent components is a doublet made up of a lens 1 of high index glass and a lens 2 of crown glass. It is by means of this doublet that correction for color is obtained.

Because of the convergent powers of the rear surface of the second lens of the doublet and of the two single lenses 3 and 4 which are near the eye, the back focal length indicated by $F_2$ may be relatively large, or about four-fifths of the effective focal length of the eyepiece, designated as F in the constructional data.

Figure 2 gives constructional data for the preferred form of our eyepiece, and this table of data is repeated below:

F equals unity

| Lens | N | V | Radii | Thicknesses |
|---|---|---|---|---|
| 1 | 1.7506 | 27.7 | $R_1 = -7.94$ F | $t_1 = .118$ F |
|   |        |      | $R_2 = +.9349$ F |  |
| 2 | 1.517  | 64.5 | $R_3 = -1.0249$ F | $t_2 = .521$ F |
|   |        |      |                   | $S_1 = .0136$ F |
|   |        |      | $R_4 = +1.0704$ F |  |
| 3 | 1.517  | 64.5 | $R_5 = +4.4071$ F | $t_3 = .225$ F |
|   |        |      |                   | $S_2 = .0728$ F |
|   |        |      | $R_6 = +1.0527$ F |  |
| 4 | 1.517  | 64.5 | $R_7 = +3.5231$ F | $t_4 = .219$ F |

In this table the lens elements are numbered from front to rear in the first column, the corresponding refractive indices N for the D line of the spectrum and the dispersive index V are given in the second and third columns. In the fourth column the radii of curvatures R are given, and in the last column are given the thicknesses $t$ of lenses and the spaces S between elements.

In this example the ratio of the V values of the glass of the front doublet is .429 while the radius of curvature of the common face is .9349 F. The outside radius of curvature of the second lens of the doublet is of assistance in properly placing the back focal length of the eye-piece and is 1.0249 F. The ratio of the radii $R_1/R_3$ is 7.75 which is of assistance in flattening the field.

The eye-piece is advantageous in use as there is space for the user's eyeglasses, if any, due to the ample back focal length. Moreover the eye-piece is adequately corrected for color due to the characteristics of the glass used for the first lens of the doublet.

We claim:

1. A telescope-eyepiece adequately corrected for color consisting of three convergent components formed of four lenses, the front component being a doublet comprising a divergent lens of relatively low dispersion glass and a convergent lens of crown glass, the dispersive indices of the two lenses of the doublet having a ratio lying between .415 and .445 and the radius of curvature of the internal contact surfaces lying between .86 F and 1.01 F, the other two convergent components being single lenses of crown glass.

2. A telescope-eyepiece adequately corrected for color as claimed in claim 1 in which the rear face of the second lens of the front doublet has a radius of curvature lying between .96 F and 1.11 F.

3. A telescope-eyepiece adequately corrected for color as claimed in claim 1 in which the ratio of the radii of the front face of the front lens and the rear face of the second lens of the doublet lies between 7.4 and 8.4.

4. A telescope-eyepiece as claimed in claim 1 in which the rear face of the second lens of the front doublet has a radius of curvature lying between .96 F and 1.11 F and the ratio of the radii of the front face of the front lens and the rear face of the second lens of the doublet lies between 7.4 and 8.4.

5. A telescope-eyepiece adequately corrected for color consisting of three convergent components formed of four lenses, the front component being a doublet with a divergent lens of relatively low dispersion glass, in which the refractive indices N and dispersive indices V of the lenses, the radii of curvature R of the optical surfaces, the thicknesses $t$ of the lenses and the spaces S between components are substantially as listed in order from front to rear under the respective headings in the following table:

| Lens | N | V | Radii | Thicknesses |
|---|---|---|---|---|
| 1 | 1.7506 | 27.7 | $R_1 = -7.94$ F | $t_1 = .118$ F |
|   |        |      | $R_2 = +.9349$ F |  |
| 2 | 1.517  | 64.5 | $R_3 = -1.0249$ F | $t_2 = .521$ F |
|   |        |      |                   | $S_1 = .0136$ F |
|   |        |      | $R_4 = +1.0704$ F |  |
| 3 | 1.517  | 64.5 | $R_5 = +4.4071$ F | $t_3 = .225$ F |
|   |        |      |                   | $S_2 = .0728$ F |
|   |        |      | $R_6 = +1.0527$ F |  |
| 4 | 1.517  | 64.5 | $R_7 = +3.5231$ F | $t_4 = .219$ F |

Where F is the focal length of the eye-piece and the + and − values of the radii R indicate surfaces respectively convex and concave to the front.

References Cited in the file of this patent

UNITED STATES PATENTS

| 1,478,704 | Erfle | Dec. 25, 1923 |
| 1,699,682 | Bertele | Jan. 22, 1929 |
| 2,206,195 | Konig | July 2, 1940 |

FOREIGN PATENTS

| 409,464 | Great Britain | May 3, 1934 |